United States Patent [19]
Jaffe et al.

[11] Patent Number: 5,325,497
[45] Date of Patent: Jun. 28, 1994

[54] METHOD AND APPARATUS FOR ASSIGNING SIGNATURES TO IDENTIFY MEMBERS OF A SET OF MASS OF STORAGE DEVICES

[75] Inventors: David H. Jaffe, Belmont; David T. Powers, Morgan Hill; Joseph S. Glider, Mountain View; Thomas E. Idleman, Santa Clara, all of Calif.

[73] Assignee: Micro Technology, Inc., Sunnyvale, Calif.

[21] Appl. No.: 501,238

[22] Filed: Mar. 29, 1990

[51] Int. Cl.$^5$ ............................................. G06F 12/00
[52] U.S. Cl. ............................... 395/425; 364/232.7; 364/245.31; 364/970.5
[58] Field of Search ............................ 364/200, 900; 395/425 MS File, 400 MS File

[56] References Cited

U.S. PATENT DOCUMENTS

| | | | |
|---|---|---|---|
| 3,303,482 | 2/1967 | Jenkins | 340/174.1 |
| 3,544,777 | 12/1970 | Winkler | 235/153 |
| 3,693,159 | 9/1972 | Hilberg | 340/172.5 |
| 3,772,652 | 11/1973 | Hilberg | 340/172.5 |
| 3,803,560 | 4/1974 | DeVoy et al. | 340/172.5 |
| 3,905,023 | 9/1975 | Perpiglia | 340/172.5 |
| 3,917,933 | 11/1975 | Scheuneman et al. | 235/153 K |
| 4,093,985 | 6/1978 | Das | 364/200 |
| 4,339,804 | 7/1982 | Davison et al. | 364/900 |
| 4,464,747 | 8/1984 | Groudan et al. | 371/50 |
| 4,467,421 | 8/1984 | White | 364/200 |
| 4,468,731 | 8/1984 | Johnson et al. | 364/200 |
| 4,507,730 | 3/1986 | Johnson et al. | 364/200 |
| 4,633,392 | 12/1986 | Vincent et al. | 364/200 |
| 4,660,141 | 4/1987 | Ceccon et al. | 364/200 |
| 4,667,326 | 5/1987 | Young et al. | 371/40 |
| 4,722,085 | 1/1988 | Flora et al. | 371/38 |
| 4,761,785 | 8/1988 | Clark et al. | 371/51 |
| 4,768,193 | 8/1988 | Takemae | 371/10 |
| 4,817,035 | 3/1989 | Timsit | 364/900 |
| 4,825,403 | 4/1989 | Gershenson et al. | 364/900 |
| 4,825,404 | 4/1989 | Theus | 364/900 |
| 4,849,929 | 7/1989 | Timsit | 364/900 |
| 4,914,656 | 4/1990 | Dunphy, Jr. et al. | |
| 4,949,298 | 8/1990 | Nakanishi et al. | 364/900 |
| 4,951,248 | 8/1990 | Lynch | 364/900 |
| 4,980,850 | 12/1990 | Morgan | 364/900 |
| 5,012,408 | 4/1991 | Conroy | 364/200 |

FOREIGN PATENT DOCUMENTS

| | | |
|---|---|---|
| 0242970 | 10/1987 | European Pat. Off. . |
| 369707 | 11/1989 | European Pat. Off. . |
| 56-94593 | 7/1981 | Japan . |
| 56-163596 | 12/1981 | Japan . |
| 56-169297 | 12/1981 | Japan . |
| 57-111890 | 7/1982 | Japan . |
| 57-111893 | 7/1982 | Japan . |
| 57-195397 | 12/1982 | Japan . |
| 58-83400 | 5/1983 | Japan . |
| 61-99999 | 10/1984 | Japan . |
| 60-156152 | 8/1985 | Japan . |
| 8809968 | 12/1988 | PCT Int'l Appl. . |
| 9000280 | 1/1990 | PCT Int'l Appl. . |

OTHER PUBLICATIONS

Program Summary, DataStorage86, An International Forum, Sep. 22-24, 1986, Red Lion Inn, San Jose, California.

(List continued on next page.)

Primary Examiner—Joseph L. Dixon
Assistant Examiner—B. Peikari
Attorney, Agent, or Firm—Mark D. Rowland; Joseph M. Guiliano

[57] ABSTRACT

A method and apparatus for identifying each of the members of a set of physical mass storage devices acting as one logical mass storage device are provided. Each physical mass storage device is assigned a membership signature identifying it as a valid member of the set. Whenever a member of a set undergoes a change in membership status, the membership signatures of all other devices in the set are changed, so that the member with the changed membership state no longer has a valid signature. When the member is reinstalled, it can be given a new valid signature after it is updated or regenerated.

26 Claims, 6 Drawing Sheets

OTHER PUBLICATIONS

W. Jilke, "Disk Array Mass Storage Systems: The New Opportunity," Amperif Corporation, dated Sep. 30, 1986.

W. Jilke, "Economics Study of Disk Array Mass Storage Systems: The Cost Reduction Opportunity," Amperif Corporation, dated Mar. 24, 1987.

D. Patterson et al., "A Case For Redundant Arrays of Inexpensive Disks (RAID)," Report No. UCB/CSD 87/391, Dec. 1987.

D. Patterson et al., "A Case for Redundant Arrays of Inexpensive Disks (RAID)," ACM SIGMOD Conference, Chicago, Illinois, Jun. 1-3, 1988.

Product Description, Micropolis 1804 SCSI Parallel Drive Array, Document No. 108120 Rev A.

Michelle Y. Kim, "Synchronized Disk Interleaving," IEEE Transactions on Computers, vol. C-35 No. 11, Nov. 1986.

D. Lieberman, "SCSI-2 Controller Board Builds Parallel Disk Drive Arrays," Computer Design, vol. 28, No. 7, Apr. 1, 1989, pp. 32, 36.

W. Meador, "Disk Array Systems," Spring COMPCON 89 Digest of Papers, IEEE Computer Society Press, pp. 143-146.

T. Olson, "Disk Array Performance In A Random IO Environment," Computer Architecture, vol. 17, No. 5, Sep. 1989, pp. 71-77.

H. Sierra, "Assessing the promise of disk arrays," Canadian Datasystems, May 1989, pp. 52-53.

D. Simpson, "RAIDs vs. SLEDs." Systems Integration, Nov. 1989, pp. 70-82.

J. Voelker, "Winchester disks reach for a gigabyte," IEEE Spectrum, Feb. 1987, pp. 64-67.

METHOD AND APPARATUS FOR ASSIGNING SIGNATURES TO IDENTIFY MEMBERS OF A SET OF MASS OF STORAGE DEVICES

BACKGROUND OF THE INVENTION

This invention relates to sets (or arrays) of physical mass storage devices that perform as a single logical mass storage device. More particularly, this invention relates to methods and apparatus for keeping track of when a particular member of the set (or array) is a valid member. As used herein, the terms "set" and "array" are synonymous.

Mass storage devices—i.e., tape and disk drives, and more commonly disk drives—are the primary storage devices for permanent data in electronic digital computer systems. It has been known to use a set of physical mass storage devices to function as one larger logical mass storage device. This might be done for several reasons. First, if one member of the set fails, the entire set need not be disabled, and a majority of the data on the logical device remains available, while new data can still be stored. Second, the access time for data may be reduced because any one read/write head—in the case of the disk drives—or tape reel—in the case of tape drives—need not move as far to find the particular data it is seeking if the physical devices are small compared to a single physical device of the same storage capacity as the set. This last factor has become more important recently in the case of disk drives in particular as the cost, speed and reliability of small disk drives have improved faster than those of larger drives. Therefore, although the present invention is applicable to any mass storage technology—i.e., disk, tape or any other technology, the discussion below will refer only to disk drives, it being understood that the scope of the present invention is not limited to disk drives.

When a set of physical disk drives is used as a single logical drive, care must be taken to maintain the integrity of data that is spread over several drives. For example, it has been known to use checksums and other error correction techniques with sets of drives to allow the reconstruction, from the active drives in a set, of data stored on a drive that is disabled or removed for other reasons.

If a set of drives can operate with one or more drives removed, data may be written to the set while the drive is removed. Depending on how data is stored across the set, the data on the removed drive may not be valid when the drive is reinstalled until it is updated or regenerated. Therefore, it is important to know, when a drive is reinstalled, whether or not it is a valid member of the set. In one known system, the computer system maintains a table or list of physical serial numbers for the members of the set and can read the serial numbers of each member, determining from the list whether the drives are valid members. However, the table of physical serial numbers in such a system is maintained in volatile memory, and is not protected in the event of a power failure. If interrupted, the system would fail, and the membership set information would be lost. Moreover, in such a system, the table or list in the computer system must be created manually and must be updated to reflect the removal of a drive and its reconnection. While such updating of the table or list might be done automatically, it has generally been done manually, by an operator. Even when the update is automatic, it requires the involvement of the central processor. Also, if the membership information is not stored in the set of drives, the information may be lost if control over the set is transferred from the device in which the table or list has been maintained to another device (e.g., if the first device fails).

It would be desirable to be able to provide a "signature" system for a set of physical disk drives functioning as one logical drive which would automatically reflect the current membership status of any drive in the set and which would automatically be updated and remain valid if an update was interrupted by a power failure.

It would also be desirable to be able to provide such a system that did not require manual intervention by an operator and did not require the involvement of the central processor.

It would also be desirable to be able to provide such a system that stored membership information on the drive or drives.

SUMMARY OF THE INVENTION

It is an object of this invention to provide a signature system for a set of physical disk drives functioning as one logical drive which automatically reflects the current membership status of any drive in the set and which is automatically updated.

It is also an object of this invention to provide such a system which automatically reflects the current membership status of any drive in the set even if interrupted by a power failure.

It is another object of this invention to provide such a system that does not require manual intervention by an operator and does not require the involvement of the central processor.

It is still another object of this invention to provide a system that stores membership information on the set of drives.

In accordance with this invention, there is provided a method for identifying members of a set of physical mass storage devices, which set forms a single logical mass storage device. The method comprises assigning a "membership signature" to each of the physical mass storage devices in the set. The membership signature identifies the physical mass storage device as a member of the set. When a member of the set undergoes a change in membership status the (e.g., removal of a physical mass storage device), a new membership signature is assigned to each remaining physical mass storage device in the set.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

In a set of physical disk drives or sections of drives being used as one logical drive in accordance with the present invention, each physical member drive is assigned a signature, or membership signature, reflecting its status as an active member of the set. The signatures for all members are identical, or at least substantially identical (e.g., the signature may include a member number that differs from drive to drive).

In accordance with the present invention, whenever any event occurs to change the membership of any of the drives in the set, the signatures of the remaining drives are changed. In the preferred embodiment of the invention, a change in membership status occurs whenever a drive is removed or added and the membership of the remaining members in the array is updated. Removal of a drive usually is the result of a malfunction of the drive, causing it to go off-line and necessitating its removal and repair. A drive may also be removed for other purposes. For example, a technician intending to remove a malfunctioning drive may accidentally remove a functioning drive, or a drive may be removed for preventive maintenance.

If the computer system or the design of the disk drive set allows, it may be possible to continue operating the set even after one or more drives have been removed. Therefore, once a drive has been removed, its data may no longer be current, so that when it is reinstalled, it should not be used by the system until it has been updated or regenerated. If the membership signatures of the other drives changed as soon as the one drive was removed, then the signature of the one drive will not have been changed and will not match the other signatures. The system will be able to see that the signature of the one drive does not match when it is reinstalled, and will avoid using the drive until the drive has been updated or regenerated. At that time, its signature will be updated along with the signatures of all of the other member drives in the set, and the drive will then be ready for use.

Figure 1:
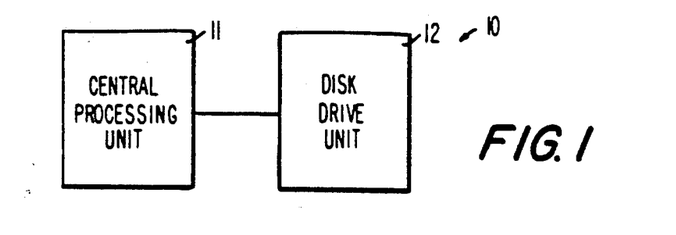
FIG. 1 is a block diagram of a computer system in which the present invention can be used.

FIG. 1 shows a block diagram of a computer system 10 in which the present invention can be used. The system includes a central processing unit 11 and at least one disk drive set 12 operating as a single logical disk drive unit. Of course, system 10 will probably include other elements (not shown) which are not relevant to the present invention.

Figure 2:
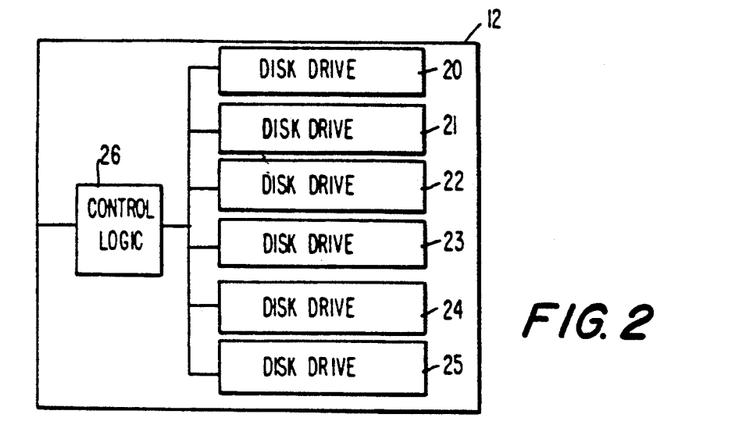
FIG. 2 is a block diagram of a disk drive set with which the present invention can be used.
Figure 3:
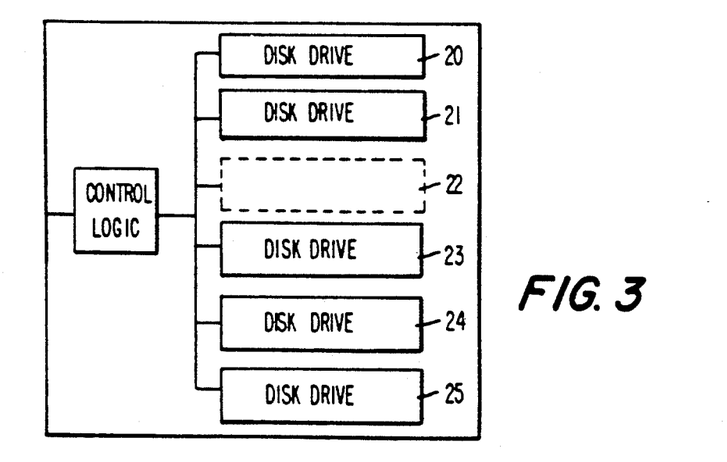
FIG. 3 is a block diagram of the disk drive set of FIG. 2 with one drive removed.

A preferred embodiment of disk drive set 12 is shown in more detail in the block diagram of FIG. 2. As seen in FIG. 2, disk drive set 12 includes six physical drives 20-25 and control logic 26, which may include a microprocessor, which controls how data is written and validated across the six drives and which also controls the assignment of membership signatures to each of drives 20-25 and the update or regeneration of reinstalled drives (these functions could be carried out by the system processor 11, but it is preferable to relieve processor 11 of that burden, allowing distributed intelligence provided in drive set 12 to handle them). In this preferred embodiment, drives 24, 25 are so-called "check drives" which are used to store redundant data such that, when drives are removed, as in the case of FIG. 3 in which drive 22 has been removed, the removed drive can be updated or regenerated when it is reinstalled. Drives 20-25, all of which share the same set of check drives 24 and 25, comprise what is referred to hereafter as a redundancy group.

Membership signatures according to the present invention are constructed from various physical or logical parameters of the drive itself. The most significant parameter is the "member sequence number," discussed in greater detail below. The membership signature can include information regarding the physical or logical mounting position of the drive, its size or other geometric properties, or other properties of the drive, as well as the identification of the drive set and the date and time when the signature is generated.

Figure 4:
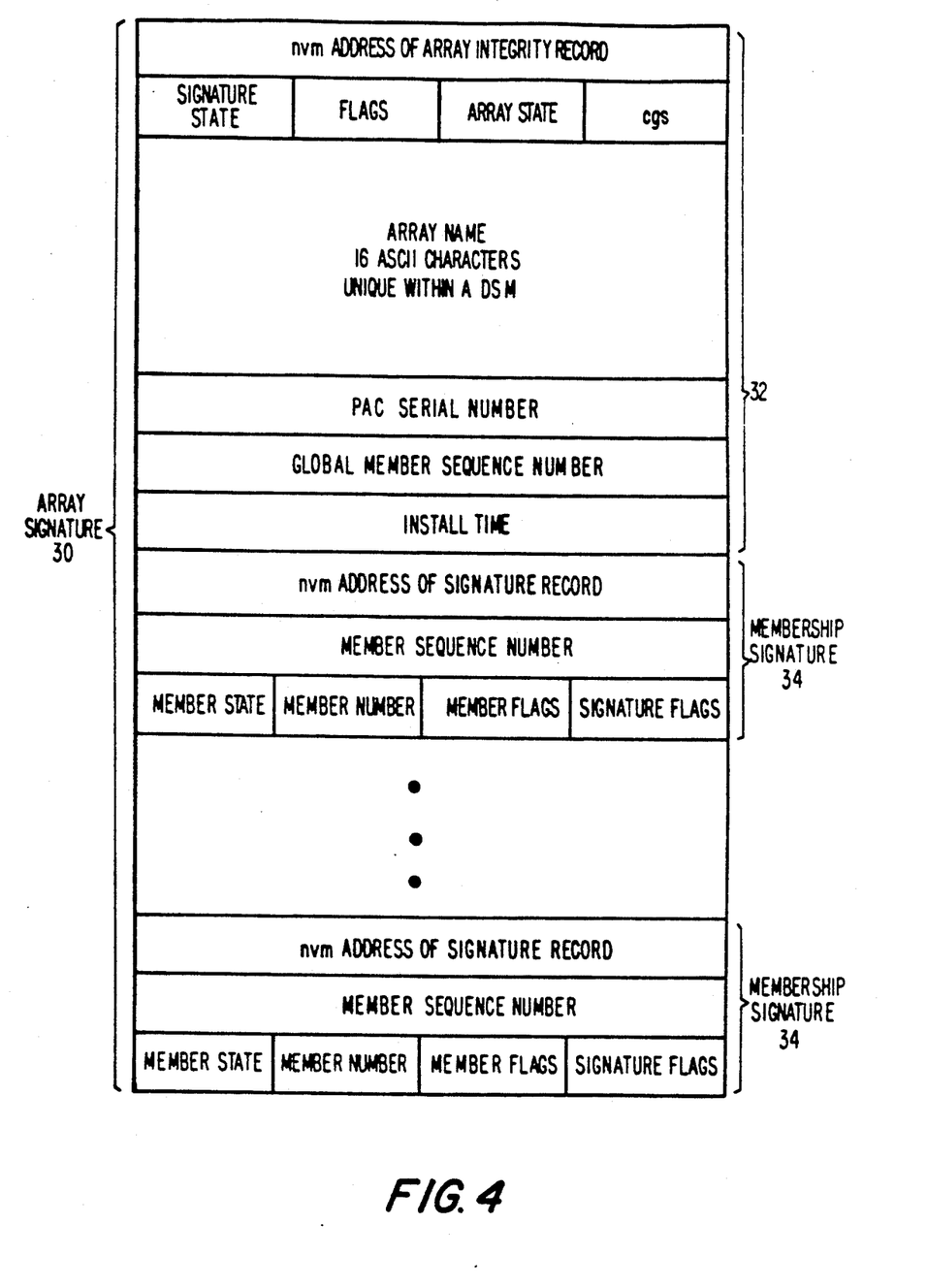
FIG. 4 is a block diagram of an exemplary array signature data structure of a preferred embodiment of the present invention.

In the preferred embodiment, membership signatures are stored as part of an array signature data structure on each mass storage device of the array. FIG. 4 shows an exemplary array signature data structure 30 in accordance with the present invention. Array signature data structure 30 includes information, designated generally by reference numeral 32 and referred to herein as an array integrity record, which is common to the entire array of devices. Array signature data structure 30 also includes a list of membership signature records 34, each of which store information about a particular member mass storage device of the array.

A similar array signature data structure is stored in non-volatile memory associated with the controller for the array (e.g., control logic circuitry 26 of FIG. 2). As explained in greater detail hereafter, the array signature data structure is stored in the array controller for purposes of checking the membership signatures on the drives of the array and for updating or regenerating a device whose member sequence number is determined to be different than that of the global member sequence number (as later discussed). Non-volatile memory is preferred to protect the stored array signature data structure from being lost if the array controller is interrupted (e.g., by a power failure) while updating the signature.

The array signature structure stored in nonvolatile memory of the array controller includes the same array integrity record 32 as is stored on each mass storage device of the array. It has been found, however, that it is not necessary to store all of the membership signature records 34 for the array, but only those membership signature records corresponding to devices that have been determined to be different than the rest of the array (up to the number of devices that can be reconstructed from the redundancy group). In other words, and as later discussed, the non-volatile memory preferably retains membership signature data for the drives with member sequence numbers which do not agree with a "global member sequence number" for the array. As a result of not storing all membership signature records for the array in the non-volatile memory of the array controller (although given sufficient non-volatile memory space in the array controller this also could be done if desired), the amount of memory required is reduced. The array signatures stored in non-volatile memory are thus referred to hereafter as "reduced" array signatures, it being understood that they may be of equal size to (or larger than) the array signature data structures stored on the mass storage devices.

The non-volatile memory of a particular array controller may include more than one reduced array signature data structure. For example, it may be desired that an array controller act as a back-up controller for a second array, taking control of the second array if the primary controller for that second array fails. In this case, it would be desirable to maintain a copy of the reduced array signature data structure for the second array in the back-up controller.

Figure 5:
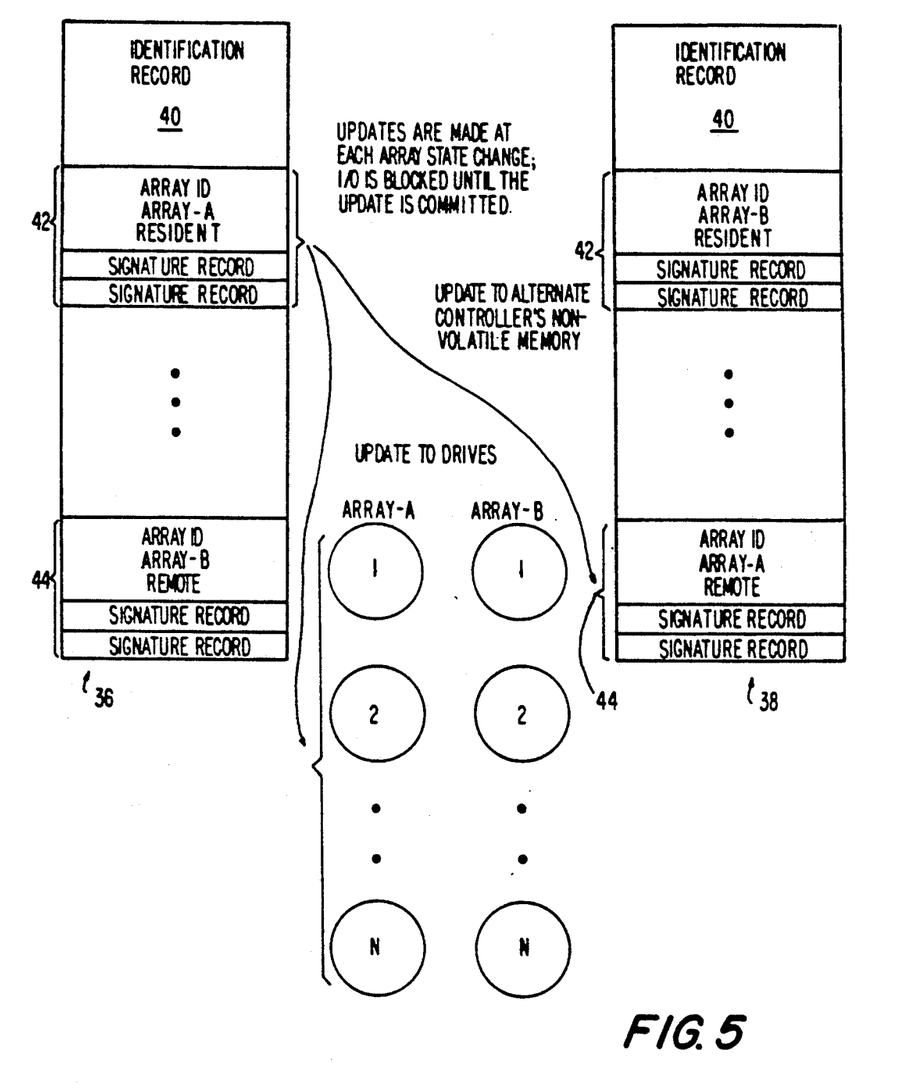
FIG. 5 is a block diagram of a preferred embodiment of a pair of disk drive arrays and corresponding array signature data structures stored in the non-volatile memory of the controllers for the respective arrays.

FIG. 5 illustrates exemplary data structures 36 and 38 for storing one or more reduced array signatures in the non-volatile memory of an array controller. Two adjacent arrays "A" and "B" are shown. Each array is controlled by a corresponding array controller (not shown) that is capable of operating as a back-up controller for the other array should the primary controller for that other array fail. Data structure 36 represents what is stored in the non-volatile memory of the primary controller for array A. Data structure 38 represents what is stored in the non-volatile memory of the primary controller for array B. Each of data structures 36 and 38 includes a controller identification record 40 and a reduced array signature record 42 for its respective "resident" array A or B. Data structures 36 and 38 also each include a copy 44 of the reduced array signature record 42 for a "remote" array of drives (e.g., drives which are linked to an adjacent and connected array controller).

Controller identification record 40 includes further information concerning the controllers and the arrays controlled by a given controller. Controller identification record 40 may include, for example, the serial numbers of the controller and alternate controllers, and the number of reduced array signature records in the controller non-volatile memory. It may also include information such as the software and hardware release numbers for the controller and array.

Referring again to the array signature data structure 30 of FIG. 4, the information in array integrity record 32 common to the entire array includes information about the signature itself (e.g., the non-volatile memory address of the array signature, flags, and the "signature state"), and information about the array of devices (including the "array state," name, controller ("PAC") serial number, and a global member sequence number). These common elements are discussed in detail below. It also includes the consistency group size (CGS), which represents the number of member devices in the array at the last time the global member sequence number was incremented.

The global member sequence number is the key element of the array signature. It is a reference number against which all of the members of the array are compared. Each membership signature includes a unique "member sequence number" which is incremented by one each time a member or the array undergoes a change in membership status. All of the member sequence numbers must match the global member sequence number. A discrepancy between a member sequence number and the global member sequence number indicates that the data on the member drive corresponding to that member sequence number must either be regenerated or reconstructed (as discussed below). The global member sequence number and the member sequence numbers are 32-bit numbers which are set to zero when the array of drives is initialized. They are incremented by one each time a member of the array undergoes a change in membership status.

The "signature state" of array integrity record 32 indicates the state of the array that the array signature 30 is describing. The signature state can be one of four alternatives: "Resident," "Remote," "Unknown," or "Free." When the signature state is "Resident," array signature 30 describes an array that was controlled at the last change in membership status by the controller associated with the non-volatile memory in which the signature is stored. When the signature state is "Remote," the signature describes an array that, at the last change in membership status, was controlled by an adjacent and connected controller (other than the controller associated with the nonvolatile memory in which the signature is stored). When the signature state is "Free," an array can be installed. When the signature state is "Unknown," the array is neither "Resident" nor "Remote," but it is installed (e.g., it is installed but has not yet been "Online" to the knowledge of the controller).

The "array state" refers to the status of the array relative to the controller. The array state can be "Online" (available); "Consistent" (a sufficient number of sequence numbers match the global member sequence number to allow the array to go "Online"); "Inconsistent" (a sufficient number of known member sequence numbers do not match the global member sequence number such that it is known that the array will not be consistent without recovery action); or "Incomplete" (insufficient information to determine whether to allow the array to go "Online").

Each membership signature record 34 may include, for example, the address of the signature record in non-volatile memory, the member sequence number, the "member state" and number, and member and signature flags.

The "member state" describes the state of individual members in an array. The member state can be one of four conditions: "Mounted" (indicates a consistent member that can be used by the array); "Regeneration" (no physical drive is presently mounted in the logical drive position; the drive data must be regenerated from redundant data stored in the array); "Reconstruction" (a drive is disposed in the drive position, but only some of the data is good—the data is being reconstructed); or "Synchronization." The Synchronization member state is used to block I/O operations to the logical member when that member is undergoing a change in membership status, until the change in membership status is "committed" (i.e., permanent in the non-volatile memory associated with the controller). The change in membership status is committed when the operation has progressed to a point beyond which permanent recording of the membership state change in the reduced array signature record stored in non-volatile memory is ensured.

Exemplary applications of the membership signature system of the present invention will now be described, with reference to FIGS. 6-8.

Figure 6:
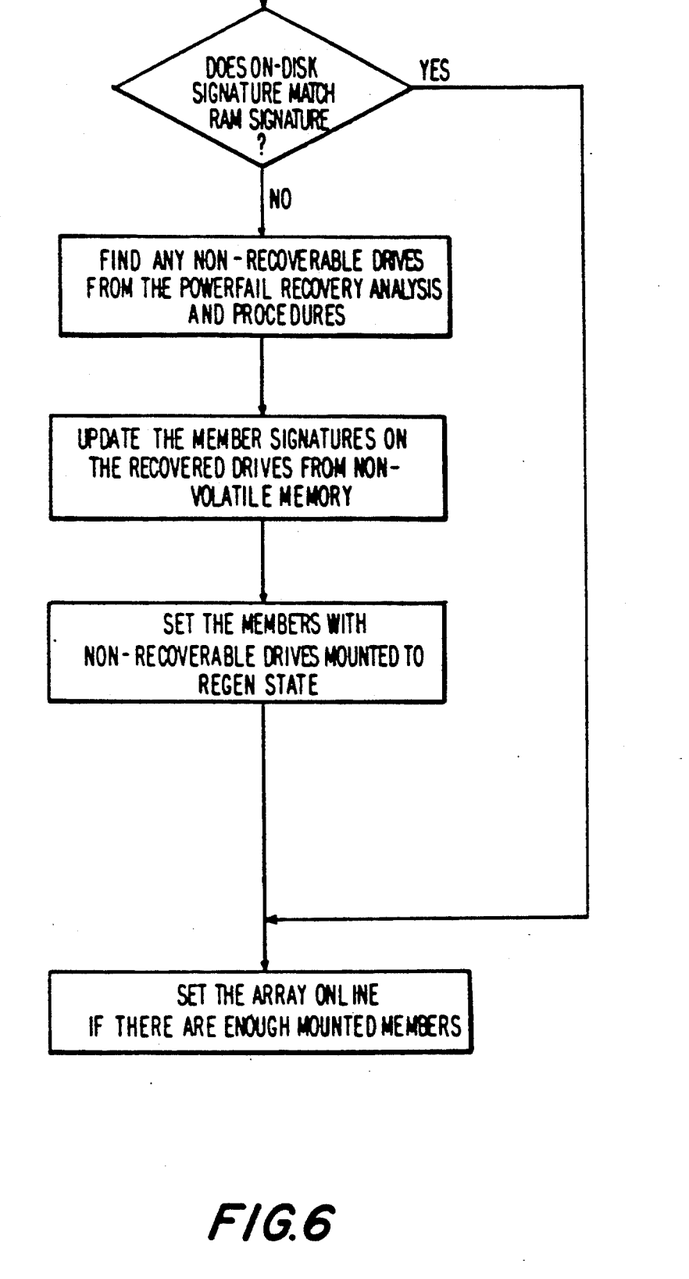
FIG. 6 is a flowchart of an illustrative process for checking array signatures.

FIG. 6 illustrates a method for checking membership signatures before placing an array "online" to a system (e.g., a central processing unit such that as shown in FIG. 1) following the return of power after a controller power failure. The controller (e.g., control logic 26 of FIG. 2) first determines whether a change in membership status was in progress. If it was not, and a sufficient number of member drives in the array are in the "Mounted" state, the array is set online. If a change in membership status was in progress, the controller associated with the array searches for any non-recoverable drives (i.e., drives with data that must be regenerated from redundant data), updates the membership signatures on the recovered drives, and sets the non-recoverable drives to the "Regeneration" state. The array is then set online if a sufficient number of member drives in the array are in the "Mounted" state (i.e., if enough drives are "Mounted" to perform I/O operations).

Figure 7:
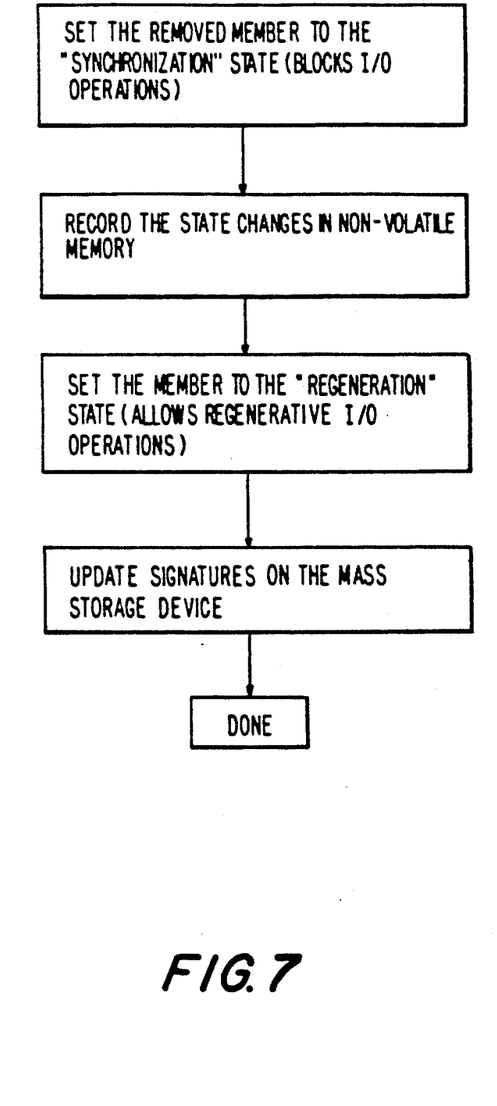
FIG. 7 is a flowchart of an illustrative process for removing a failed drive from an array.

FIG. 7 illustrates the process by which failed drives are temporarily removed from an array to be regenerated. The failed drive is first set to the "Synchronization" state. This blocks all I/O operations to the drive. The change in membership status is then recorded in the controller (off-drive) non-volatile memory. The failed member is then set to the "Regeneration" state, to allow regenerative I/O operations to take place. The membership signatures are updated on the mass storage device, and the process is complete.

Figure 8:
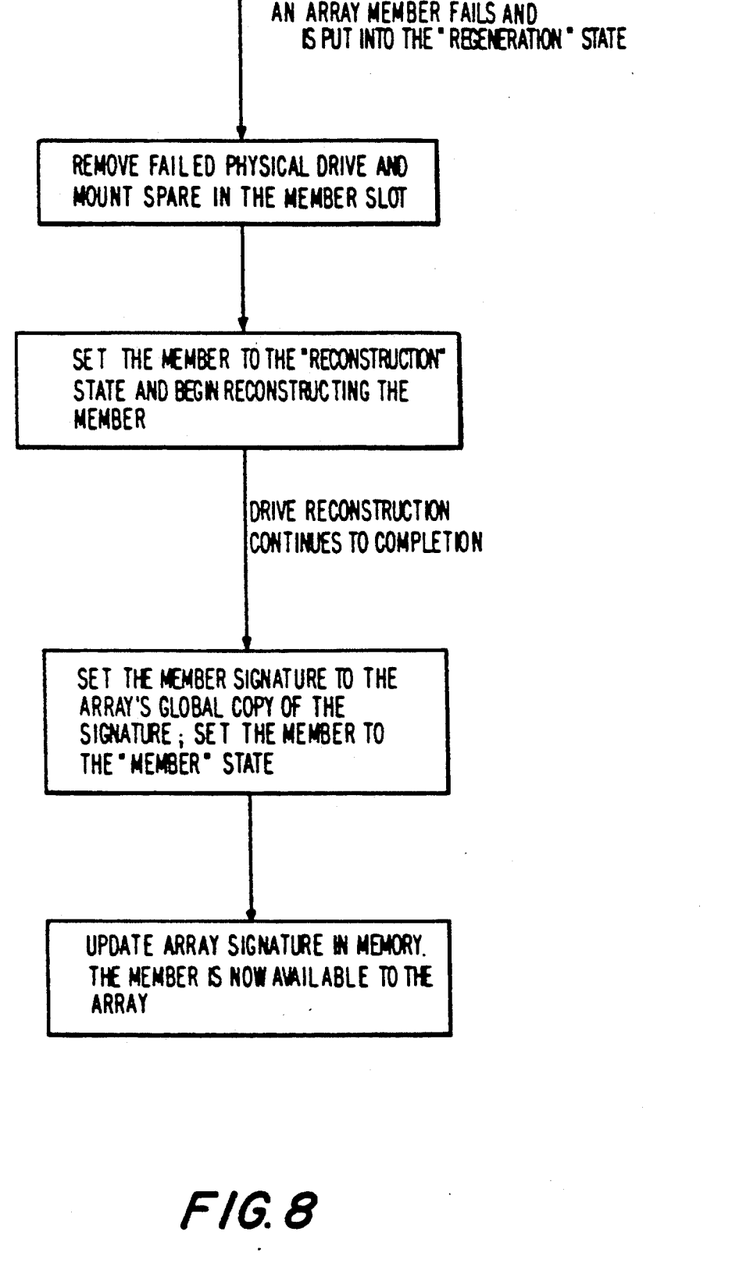
FIG. 8 is a flowchart of an illustrative process for replacing a failed drive of an array.

The process for replacing a failed member of an array is illustrated in FIG. 8. Once the failed member is set to the "Regeneration" state, the failed physical drive is removed from the member slot and replaced with a new drive. The new member is set to the "Reconstruction" state, and the data is reconstructed from data stored on other members of the array. The member sequence number corresponding to the newly reconstructed member is set equal to the global member sequence number, and the new member is set to the "Mounted" state. The process of updating the new signature at all memory locations then begins. After the update is committed, the new member is available to the array.

Thus it is seen that this invention provides a signature system for a set of physical disk drives functioning as one logical drive which automatically reflects the current membership status of any drive in the set and which is automatically updated. The invention also provides such a system that does not require manual intervention by an operator and does not require the involvement of the central processor. One skilled in the art will appreciate that the present invention can be practiced by other than the described embodiments, which are presented for purposes of illustration and not of limitation, and the present invention is limited only by the claims which follow.

What is claimed is:

1. A method for identifying members of a logical set of mass storage devices, comprising the steps of:
   defining a global identifier for said logical set which serves as a reference for identifying mass storage devices included in said logical set;
   assigning membership signatures to a plurality of mass storage devices, wherein said membership signatures comprise information substantially matching said global identifier which identifies said plurality of mass storage devices as members of said logical set; and
   when a member of said logical set undergoes a change in membership status, defining a new global identifier for said logical set different from said global identifier which thereafter serves as a reference for identifying members of said logical set, and assigning new membership signatures to other ones of said plurality of mass storage devices that remain members of said logical set, wherein said new membership signatures comprise different information substantially matching said new global identifier which identifies said other ones of said plurality of mass storage devices as members of said logical set.

2. The method of claim 1 wherein said change in membership status comprises the removal of said member from said logical set.

3. The method of claim 2 wherein the removal is physical.

4. The method of claim 2 wherein the removal is logical.

5. The method of claim 1 wherein said change in membership status comprises the removal of said member from said logical set and a writing of data onto said other ones of said plurality of mass storage devices while said member is removed.

6. The method of claim 5 wherein the removal of said member comprises physical disconnection of said member from said logical set.

7. The method of claim 5 wherein the removal of said member comprises logical identification of said member as unavailable to said logical set.

8. The method of claim 1 wherein said membership signatures and said new membership signatures are stored on, respectively, said plurality of mass storage devices and said other ones of said plurality of mass storage devices to which said membership signatures and said new membership signatures are assigned.

9. The method of claim 1 wherein each of said membership signatures and each of said new membership signatures are derived from characteristics of said logical set and, respectively, from characteristics of each of said plurality of mass storage devices and said other ones of said plurality of mass storage devices to which each of said membership signatures and each of said new membership signatures are assigned.

10. The method of claim 9 wherein said membership signatures and said new membership signatures are derived from at least one of a data and a time when said membership signatures and said new membership signatures are derived.

11. The method of claim 9 wherein said characteristics of said logical set are selected from the group consisting of a name of said logical set, memory addresses of said membership signatures and said new membership signatures, a signature state, an array state and a controller serial number.

12. The method of claim 9 wherein said characteristics of each of said plurality of mass storage devices and said other ones of said plurality of mass storage devices to which each of said membership signatures and said new membership signatures are respectively assigned are selected from the group consisting of a memory address of a signature record, a member state, a member number and a member sequence number.

13. The method of claim 1 wherein said global identifier and said new global identifier comprise global member sequence numbers.

14. An apparatus for identifying members of a logical set of mass storage devices, comprising:
   means for defining a global identifier for said logical set which serves as a reference for identifying mass storage devices included in said logical set;
   means for assigning membership signatures to a plurality of mass storage devices, wherein said membership signatures comprise information substantially matching said global identifier which identifies said plurality of mass storage devices as members of said logical set; and means for, when a member of said logical set undergoes a change in membership status, defining a new global identifier for said logical set different from said global identifier which thereafter serves as a reference for identifying members of said logical set, and assigning new membership signatures to other ones of said plurality of mass storage devices that remain members of said set, wherein said new membership signatures comprise different information substantially matching said new global identifier which identifies said other ones of said plurality of mass storage devices as members of said logical set.

15. The apparatus of claim 14 wherein said change in membership status comprises the removal of said member from said logical set.

16. The apparatus of claim 15 wherein the removal is physical.

17. The apparatus of claim 15 wherein the removal is logical.

18. The apparatus of claim 14 wherein said change in membership status comprises the removal of said member from said logical set and a writing of data onto said other ones of said plurality of mass storage devices while said member is removed.

19. The apparatus of claim 18 wherein the removal of said member comprises physical disconnection of said member from said logical set.

20. The apparatus of claim 18 wherein the removal of said member comprises logical identification of said member as unavailable to said logical set.

21. The apparatus of claim 14 wherein said membership signatures and said new membership signatures are stored on, respectively, said plurality of mass storage devices and said other ones of said plurality of mass storage devices to which said membership signatures and said new membership signatures are assigned.

22. The apparatus of claim 14 wherein each of said membership signatures and each of said new membership signatures are derived from characteristics of said logical set and, respectively, from characteristics of each of said plurality of mass storage devices and said other ones of said plurality of mass storage devices to which each of said membership signatures and each of said new membership signatures are assigned.

23. The apparatus of claim 22 wherein said membership signatures and said new membership signatures are derived from at least one of a date and a time when said membership signatures and said new membership signatures are derived.

24. The apparatus of claim 22 wherein said characteristics of said logical set are selected from the group consisting of a name of said logical set, memory addresses of said membership signatures and said new membership signatures, a signature state, an array state and a controller serial number.

25. The apparatus of claim 22 wherein said characteristics of each of said plurality of mass storage devices and said other ones of said plurality of mass storage devices to which each of said membership signatures and said new membership signatures are respectively assigned are selected from the group consisting of a memory address of a signature record, a member state, a member number and a member sequence number.

26. The apparatus of claim 14 wherein said global identifier and said new global identifier comprise global member sequence numbers.

* * * * *